US007709789B2

(12) United States Patent
Vestal et al.

(10) Patent No.: US 7,709,789 B2
(45) Date of Patent: May 4, 2010

(54) TOF MASS SPECTROMETRY WITH CORRECTION FOR TRAJECTORY ERROR

(75) Inventors: Marvin L. Vestal, Framingham, MA (US); Kevin Hayden, Newton, NH (US)

(73) Assignee: Virgin Instruments Corporation, Sudbury, MA (US)

( * ) Notice: Subject to any disclaimer, the term of this patent is extended or adjusted under 35 U.S.C. 154(b) by 148 days.

(21) Appl. No.: 12/129,277

(22) Filed: May 29, 2008

(65) Prior Publication Data

US 2009/0294658 A1 Dec. 3, 2009

(51) Int. Cl.
*H01J 49/40* (2006.01)
*H01J 49/00* (2006.01)
*B01D 59/44* (2006.01)

(52) U.S. Cl. ....................... 250/287; 250/281; 250/397; 250/396 R; 250/423 R; 250/492.3

(58) Field of Classification Search ................. 250/287, 250/281, 397, 396 R, 423 R, 492.3
See application file for complete search history.

(56) References Cited

U.S. PATENT DOCUMENTS 5,144,127 A 9/1992 Williams et al.
5,160,840 A * 11/1992 Vestal ........................ 250/287
5,625,184 A 4/1997 Vestal et al.
5,627,369 A 5/1997 Vestal et al.
5,847,385 A 12/1998 Dresch
6,057,543 A 5/2000 Vestal et al.
6,680,475 B2 * 1/2004 Krutchinsky et al. ........ 250/281
6,833,543 B2 * 12/2004 Krutchinsky et al. ........ 250/281
7,223,966 B2 5/2007 Weiss et al.
2005/0269505 A1 12/2005 Hermer
2008/0272291 A1 * 11/2008 Vestal ........................ 250/287

OTHER PUBLICATIONS

Beavis, Ronald C., Factors Affecting The Ultraviolet Laser Desorption of Properties, Rapid Communications in Mass Spectrometry, 1989, pp. 233-237, vol. 3, No. 9, Heyden & Son Limited.

(Continued)

*Primary Examiner*—Nikita Wells
(74) *Attorney, Agent, or Firm*—Kurt Rauschenbach; Rauschenbach Patent Law Group, LLC

(57) ABSTRACT

A time-of-flight mass spectrometer includes a pulsed ion source that generates a pulse of ions from a sample to be analyzed. An ion lens focuses the pulse of ions into an ion beam. An ion deflector deflects the ion beam into a deflected ion beam path. An ion mirror is positioned in the deflected ion beam path so that a plane of constant ion flight time is parallel to an input surface of the ion mirror. The ion mirror decelerates and then accelerates ions so that ions of like mass and like charge exit the ion mirror in a reflected ion beam and reach an ion detector at substantially the same time. An ion detector is positioned in the path of the reflected ion beam so that a plane of constant ion flight time is substantially parallel to an input surface of the ion detector. The ion detector detects a time-of-flight of ions from the pulsed ion source to the ion detector that is substantially independent of a path traveled.

20 Claims, 7 Drawing Sheets

OTHER PUBLICATIONS

Bergmann, T., et al., High-Resolution Time-Of-Flight Mass Spectrometer, Rev. Sci. Instrum., Apr. 1989, pp. 792-793, vol. 60, No. 4, American Institute of Physics.

Beussmann, Douglas J., et al., Tandem Reflectron Time-Of-Flight Mass Spectrometer Utilizing Photodissocation, Analytical Chemistry, Nov. 1, 1995, pp. 3952-3957, vol. 67, No. 21, American Chemical Society.

Colby, Steven M., et al., Space-Velocity Correlation Focusing, Analytical Chemistry, Apr. 15, 1996, pp. 1419-1428, vol. 68, No. 8, American Chemical Society.

Cornish, Timothy J., et al., A Curved Field Reflectron Time-Of-Flight Mass Spectrometer For The Simultaneous Focusing Of Metastable Product Ions, Rapid Communication In Mass Spectrometry, 1994, pp. 781-785, John Wiley & Sons.

Cornish, Timothy J., et al., Tandem Time-Of-Flight Mass Spectrometer, Analytical Chemistry, Apr. 15, 1993, pp. 1043-1047, vol. 65, No. 8.

Hillenkamp, F., Laser Desorption Mass Spectrometry: Mechanisms, Techniques and Applications, 1989, pp. 354-362, vol. 11A, Heyden & Son, London.

Kaufmann, R., et al., Mass Spectrometric Sequencing Of Linear Peptides By Product-Ion Analysis In A Reflection Time-Of-Flight Mass Spectrometer Using Matrix-Assisted Laser Desorption Ionization, Rapid Communications In Mass Spectrometry, 1993, pp. 902-910, vol. 7, Johh Wiley & Sons, Ltd.

Mamyrin, B.A., et al., The Mass-Reflectron, A New Nonmagnetic Time-Of-Flight Mass Spectrometer With High Resolution, Sov. Phys. 1973, pp. 45-48, Vo. 37, No. 1, American Institute of Physics.

Matsuda, H., et al., Particle Flight Times Through Electrostatic and Magnetic Sector Fields and Quadruploes To Second Order, International Journal Of Mass Spectrometry and Ion Physics, 1982, pp. 157-168, vol. 42, Elsevier Scientific Publishing Company, Amsterdam, The Netherlands.

Neuser, H. J., et al., High-Resolution Laser Mass Spectrometry, International Journal Of Mass Spectrometry and Ion Process, 1984, pp. 147-156, vol. 60, Elsevier Science Publishers B.V., Amsterdam, The Netherlands.

Vestal, M. L., et al., Delayed Extraction Matrix-Assisted Laser Desorption Time-Of-Flight Mass Spectrometry, Rapid Communications in Mass Spectrometry, 1995, pp. 1044-1050, vol. 9, John Wiley & Sons, Ltd.

Vestal, M. L., et al., Resolution and Mass Accuracy in Matrix-Assisted Laser Desorption Ionization-Time-of-Flight, American Society for Mass Spectrometry, 1998, pp. 892-911, Elsevier Science Inc.

Vestal, M., High Performance MALDI-TOF Mass Spectrometry for Proteomics, International Journal of Mass Spectrometry, 2007, pp. 83-92.

Wiley, W. C., et al., Time-Of-Flight Mass Spectrometer With Improved Resolution, The Review of Scientific Instruments, Dec. 1955, pp. 1150-1157, vol. 26, No. 13.

Zhou, J., Kinetic Energy Measurements Of Molecular Ions Ejected Into An Electric Field By Matrix-Assisted Laser Desorption, Rapid Communications In Mass Spectrometry, Sep. 1992, pp. 671-678, vol. 6, John Wiley & Sons, Ltd.

"Notification Of Transmittal Of The International Search Report And The Written Opinion Of The International Searching Authority, Or The Declaration" For PCT/US09/045108, Korean Intellectual Property Office, Jan. 11, 2010, 14 pages, Seo-gu, Republic of Korea.

* cited by examiner

500

TOF MASS SPECTROMETRY WITH CORRECTION FOR TRAJECTORY ERROR

The section headings used herein are for organizational purposes only and should not to be construed as limiting the subject matter descibed in the present application.

BACKGROUND OF THE INVENTION

Time-of-flight (TOF) mass spectrometers are well known in the art. Wiley and McLaren described the theory and operation TOF mass spectrometers more than 50 years ago. See W. C. Wiley and I. H. McLaren, "Time-of-Flight Mass Spectrometer with Improved Resolution", Rev. Sci. Instrum. 26, 1150-1157 (1955). During the first two decades after the discovery of the TOF mass spectrometer, the instrument was generally considered as a useful tool for exotic studies of ion properties, but was not widely used to solve analytical problems.

Numerous more recent discoveries, such as the discovery of naturally pulsed ion sources (e.g. plasma desorption ion source), static Secondary Ion Mass Spectrometry (SIMS), and Matrix-Assisted Laser Desorption/Ionization (MALDI) has led to renewed interest in TOF mass spectrometer technology. See, for example, R. J. Cotter, "Time-of-Flight Mass Spectrometry: Instrumentation and Applications in Biological Research," American Chemical Society, Washington, D.C. (1997) for a description of the history, development, and applications of TOF-MS in biological research.

More recently work has focused on developing new and improved TOF instruments and software that allow the full potential mass resolution of MALDI to be applied to difficult biological analysis problems. The discoveries of electrospray (ESI) and MALDI removed the volatility barrier for mass spectrometry. Electrospray mass spectrometers developed very rapidly, at least in part due to the ease in which these instruments interface with commercially available quadrupole and ion trap instruments that were widely employed for many analytical applications. Applications of MALDI have developed more slowly, but the potential of MALDI has stimulated development of improved TOF instrumentations that are designed for MALDI ionization techniques.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed descriptions about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Figure 1A:
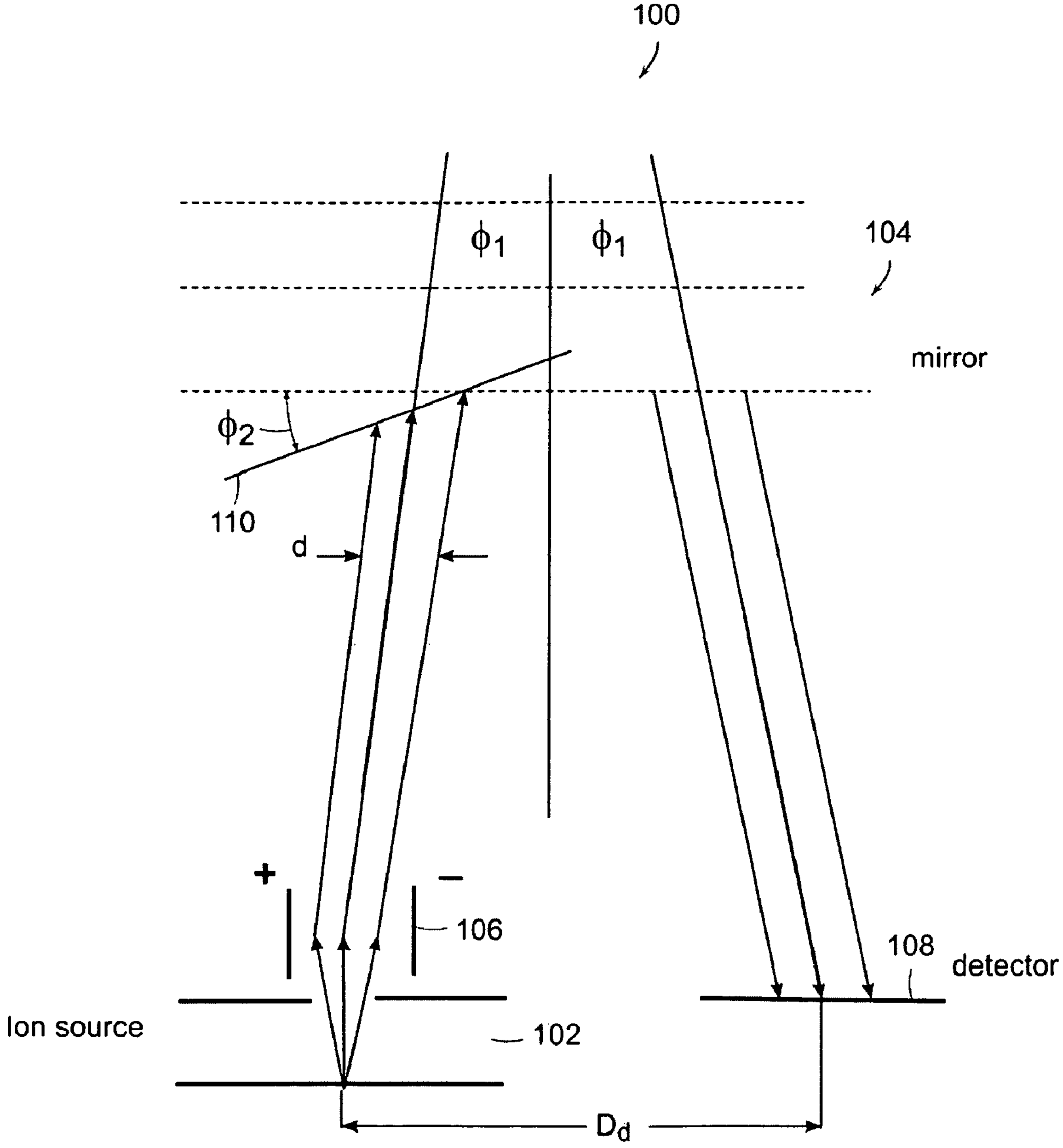
PRIOR ART FIG. 1A
FIG. 1A illustrates an ion path diagram for a known TOF mass spectrometer geometry that includes a parallel ion source and ion mirror geometry.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present invention relates to techniques for optimizing the resolving power of TOF mass spectrometers, particularly for applications using MALDI. These techniques can be used with both linear and reflecting mass analyzers. The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein.

The invention of matrix-assisted laser desorption-ionization (MALDI) has resulted in a revival of interest in TOF mass spectrometry. MALDI is a well known and established technique for analyzing a variety of nonvolatile molecules including proteins, peptides, oligonucleotides, lipids, glycans, and other molecules of biological importance. MALDI mass spectrometers are commercially available from a number of vendors.

Matrix-assisted laser desorption/ionization ion sources embed matrix crystals deposited on the surface of a sample to be analyzed. The sample is positioned on a plate that comprises one electrode of an ion accelerator. A laser pulse impinges on the crystals and produces a pulse of desorbed material including ions within a plume of neutrals. Pulsed and static electric fields may be applied to accelerate and focus the ions in both space and time. The ideal ion source produces a narrow, nearly parallel beam with ions of each m/z arriving at a detector with a flight time that is nearly independent of the initial position and velocity of the ions.

The accuracy of MALDI TOF mass spectrometers is limited by the initial velocity distribution and by the initial position distribution. The initial velocity distribution of ions produced by MALDI is independent of the ion mass. The initial velocity distribution of ions depends on properties of the matrix and on the laser fluence and has been determined by several research groups to be less than 1,000 m/s. It has been determined that a mean value of about 400 m/s and a similar value for the width of the distribution (FWHM) accounts satisfactorily for observed behavior with a 4-hydroxy-α-cyanocinnamic acid matrix. The initial position for ion formation appears to be determined primarily by the size of the matrix crystals, and it has been determined that a value of 10 μm is a satisfactory approximation in many cases.

Early MALDI TOF mass spectrometers employed a reflecting analyzer with static electric fields that provided continuous extraction. See M. Karas and F. Hillenkamp, "Laser Desorption Ionization of Proteins with Molecular Masses Exceeding 10,000 Daltons", Anal. Chem. 60, 2299-2301 (1988). The first mass spectrum of a molecule of mass greater than 100,000 Daltons showing singly charged molecular ions was obtained with such an analyzer. The major limitation in the resolving power was due to ion fragmentation in flight. The resolving power of high masses is limited by the initial velocity distribution, but the initial position spread is the primary limit across most of the mass range. The resolving power at lower masses can be improved by using an optimum length of the accelerating region.

The resolving power of TOF mass spectrometers can also be improved by using an ion mirror, which is also called an ion reflector and a reflectron, to compensate for the effects of an initial kinetic energy distribution. Ion mirrors are also used to correct the energy of ions and/or fragments after they move through a field-free drift space. Ion mirrors can provide isotopic resolution up to about 4 kDa. However, ion mirrors do not correct for the first order term in velocity that is due to the time required for ions to exit the ion source.

Pulsed ion sources that implement "time lag focusing" or "delayed extraction" have been used to further increase mass resolution by focusing the ions in time to reduce the effect of initial position and initial velocity on the peak width at the ion detector. The time of flight is measured relative to the time that the extraction pulse is applied to the source electrode. The extraction delay is the time between the application of the laser pulse to the ion source and the application of the extraction pulse. The measured flight time is relatively insensitive to the magnitude of the ion extraction delay. However, jitter between the laser pulse and the extraction pulse causes a corresponding error in the velocity focus. In some cases the jitter can be the most significant contribution to the peak width.

One advantage of delayed acceleration is that the resolving power of pulsed acceleration TOF mass spectrometers is much less dependent on the laser fluence than the resolving power of systems with continuous acceleration. Another advantage of delayed acceleration is that the delay allows the plume produced by laser desorption to disperse in a field-free region before an accelerating field is applied and, therefore, reduces collisions of energetic ions with neutrals. These collisions both broaden the translational energy distribution and cause internal excitation of the ions leading to increased fragmentation in flight. In contrast, acceleration of ions by continuous extraction may cause frequent collisions of energetic ions with neutrals in the dense plume formed immediately following the laser pulse.

For any given geometry, the maximum resolving power of TOF mass spectrometers increases monotonically with increasing delay time between the laser pulse and the extraction pulse. However, an increase in maximum resolving power is accompanied by an increasing dependence on mass. It has been empirically determined that a minimum delay of about 200 ns is required to realize the advantages of pulsed acceleration. If the delay exceeds 2,000 ns, the ion beam will be significantly dispersed before the acceleration pulse is applied which will make it difficult to spatially focus the ions onto the ion detector. Thus, at higher delays, it is theoretically possible to achieve very high resolving power at the focused mass, but the range of focus is very narrow.

Linear TOF mass spectrometers with pulsed acceleration provide excellent sensitivity for high mass ions and can provide nearly constant low resolving power over a broad mass range. However, an ion mirror is required for higher resolving power. The major advantage gained from adding an ion mirror is that it allows the effective path length to be increased without increasing other factors that contribute to the peak width so that high performance can be obtained with a time-of-flight mass spectrometer having modest dimensions.

The maximum resolving power of TOF mass spectrometers is also limited by uncertainty in the time measurement determined by the finite width of single ion pulses and the width of the bins in the digitizer. With standard 5 μm dual-channel plate detectors and digitizers with 0.5 ns bins, the uncertainty δt is about 1.5 ns. Commercial detectors are currently available that provide single ion peak widths less than 0.5 ns. Commercial digitizers with 0.25 nsec bins are currently available. These detectors and digitizers may allow the uncertainty, δt, in the time measurement to be reduced to a minimum of about 0.5 ns, which does not limit state-of-the art TOF mass spectrometers.

The maximum resolving power of state-of-the-art TOF mass spectrometers is limited by noise present on the high voltage that power the ion lenses, the ion mirror, and other electrical components. In particular, noise on the high voltage driving the ion mirror limits the resolving power because of the relatively large effective flight path of the ion mirror, which is typically ⅓ or more of the total flight path.

The maximum resolving power of state-of-the-art TOF mass spectrometers is also limited by trajectory error. Trajectory error occurs when ions with the same nominal velocity acquire different flight times because the ions follow different trajectories through the analyzers. These errors may be introduced by the ion lenses, ion deflectors, and the ion detectors. A major contribution to the trajectory error is often the entrance into the channel plates of the ion detector. It has been determined that trajectory errors associated with ion deflectors is often a limiting factor in achieving high resolving power.

Applications for MALDI TOF mass spectrometers have not developed as rapidly as those for electrospray. Widespread acceptance of MALDI TOF mass spectrometers has been limited by several factors including cost and complexity of the instruments, relatively poor reliability, and relatively poor performance metrics, such as measurement speed, mass sensitivity, mass resolution, and mass accuracy. The maximum measured resolving power of MALDI TOF reflecting mass spectrometers were determined to be more than a factor of two lower than the calculated resolving power using a comprehensive theoretical model. For example, see M. L. Vestal and P. Juhasz, "Resolution and Mass Accuracy in Matrix-Assisted Laser Desorption Time-of-Flight Mass Spectrometry", J. Am. Soc. Mass Spectrom. 1998 9, 892-911, which describes a comprehensive theoretical model of the various components of a TOF analyzer.

Possible sources of the discrepancy between the theoretical and the measured resolution of MALDI TOF reflecting mass spectrometers were identified as either trajectory errors or noise on the high voltage waveforms driving the ion mirror. A potential error due to misalignment between the ion mirror and the ion detector resulting from improper alignment of the drift tube flanges was investigated and found to be insignificant. It has been determined that the most significant limitation on mass resolution with current MALDI TOF reflecting mass spectrometers is due to the trajectory error that is introduced by ion deflectors that are used to direct the ions into the ion mirror at the desired angle for ion detection.

Figure 1B:
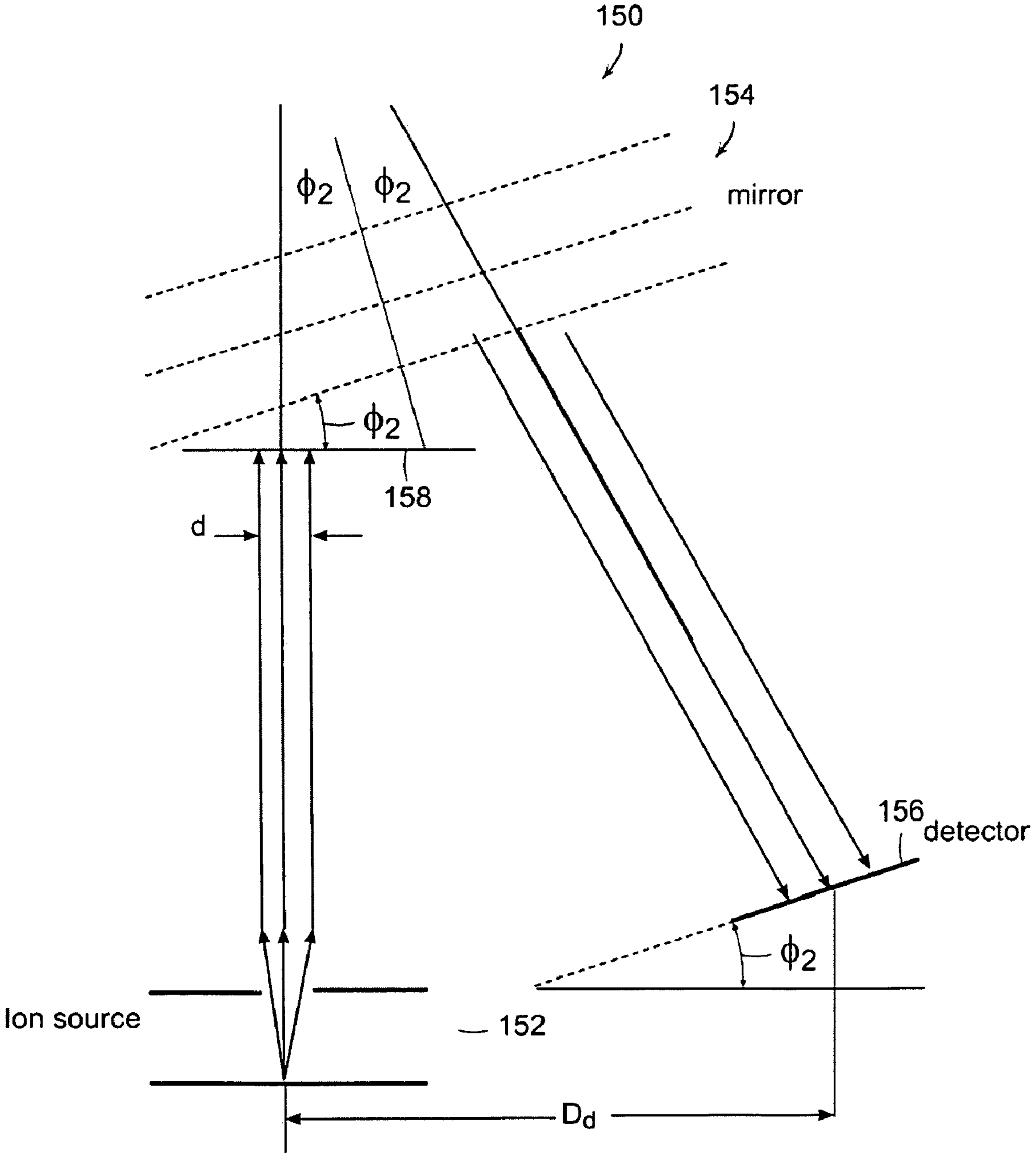
PRIOR ART FIG. 1B
FIG. 1B illustrates an ion path diagram for a known TOF mass spectrometer geometry that includes an ion source that is positioned at an angle relative to the ion mirror.

FIGS. 1A and 1B present ion path diagrams 100, 150 that illustrate the trajectory error introduced by the ion deflector that currently limits resolution in state-of-the-art TOF mass spectrometers. In known TOF mass spectrometers, the ion beam is deflected or the ion mirror is positioned at a small angle relative to the incident ion beam so that the reflected beam strikes the ion detector.

FIG. 1A illustrates an ion path diagram 100 for a known TOF mass spectrometer geometry that includes a parallel ion source 102 and ion mirror 104 geometry. The ion source 102 generates the ions to be analyzed. An ion deflector 106 is used to deflect the ions from the ion source 102 to an angle where the ions are reflected by the ion mirror 104 to an ion detector 108. The TOF mass spectrometer geometry shows a plane 110 of constant ion flight time where the first ions deflected by the ion deflector 106 reach the ion mirror 104. The plane 110 of constant ion flight time forms an angle $\phi_2$ with the input surface of the ion mirror 104 which indicates that the ions deflected from the ion deflector 106 reach the ion mirror 104 at different times.

FIG. 1B illustrates an ion path diagram 150 for a known TOF mass spectrometer geometry that includes an ion source 152 that is positioned at an angle relative to an ion mirror 154. The ion source 152 generates the ions to be analyzed. An ion deflector is not used to deflect the ions from the ion source 152 in this geometry. Instead, the input surface of the ion mirror 154 is positioned at an angle relative to the ion source 152 in order for the ions to be reflected by the ion mirror 154 to the ion detector 156. The TOF mass spectrometer geometry shows a plane 158 of constant ion flight time where the ions from the ion source 152 reach the ion mirror 154. The plane 158 of constant ion flight time forms an angle $\phi_2$ with the input surface of the ion mirror 154 which indicates that the ions reach the ion mirror 154 at different times.

Thus, in each of the TOF mass spectrometer geometries shown in the ion path diagrams 100, 150 of FIGS. 1A and 1B, some ions with the same nominal translational energy have different flight times because of their different effective ion path lengths. Ideally, the ion path from the ion sources 102, 152 to the ion mirrors 104, 154 should be parallel to the ion path from the ion mirrors 104, 154 to the ion detectors 108, 156, so that the total ion flight time depends only on the velocity component parallel to the electric field vector. Under these conditions, the transverse components affect transmission and detection efficiency, but have no effect on the flight time. Such a geometry, however, is impractical since this geometry would requires that the ion sources 102, 152 and the ion detectors 108, 156 be in a coaxial orientation.

In each of the TOF mass spectrometer geometries shown in FIGS. 1A and 1B, the angle between the planes of constant ion flight times 110, 158 and the entrance into the ion mirrors 104, 154 is $\phi_2$. The trajectory error is then $$\Delta m/m = 2d \sin \phi_2 / D_e$$

where $D_e$ is the effective length of the TOF mass spectrometer and d is the diameter of the ion beam at the entrance to the ion mirror. In TOF mass spectrometry, the effective length is defined as the length of a field-free region for which the flight time for a given ion is identical to that for the real device containing ion optical elements, such as lenses, mirror, and deflectors. The angle $\phi_2$ can be calculated relative to angle $\phi_1$ for a given deflector geometry using SIMION, which is a well known simulation program in the art. For example, a prototype reflector instrument has been constructed with a deflected ion beam width d equal to 4 mm, an effective length between the ion sources 102, 152 and the ion detectors 108, 156 $D_e$ equal to 3,200 mm, and an angle $\phi_2$ equal to one degree. This geometry corresponds to a maximum resolving power of about 23,000 Daltons that, together with the other contributions to peak width, gives results that are in good agreement with the previous observations of a maximum resolving power of about 16,000 Daltons.

Figure 2:
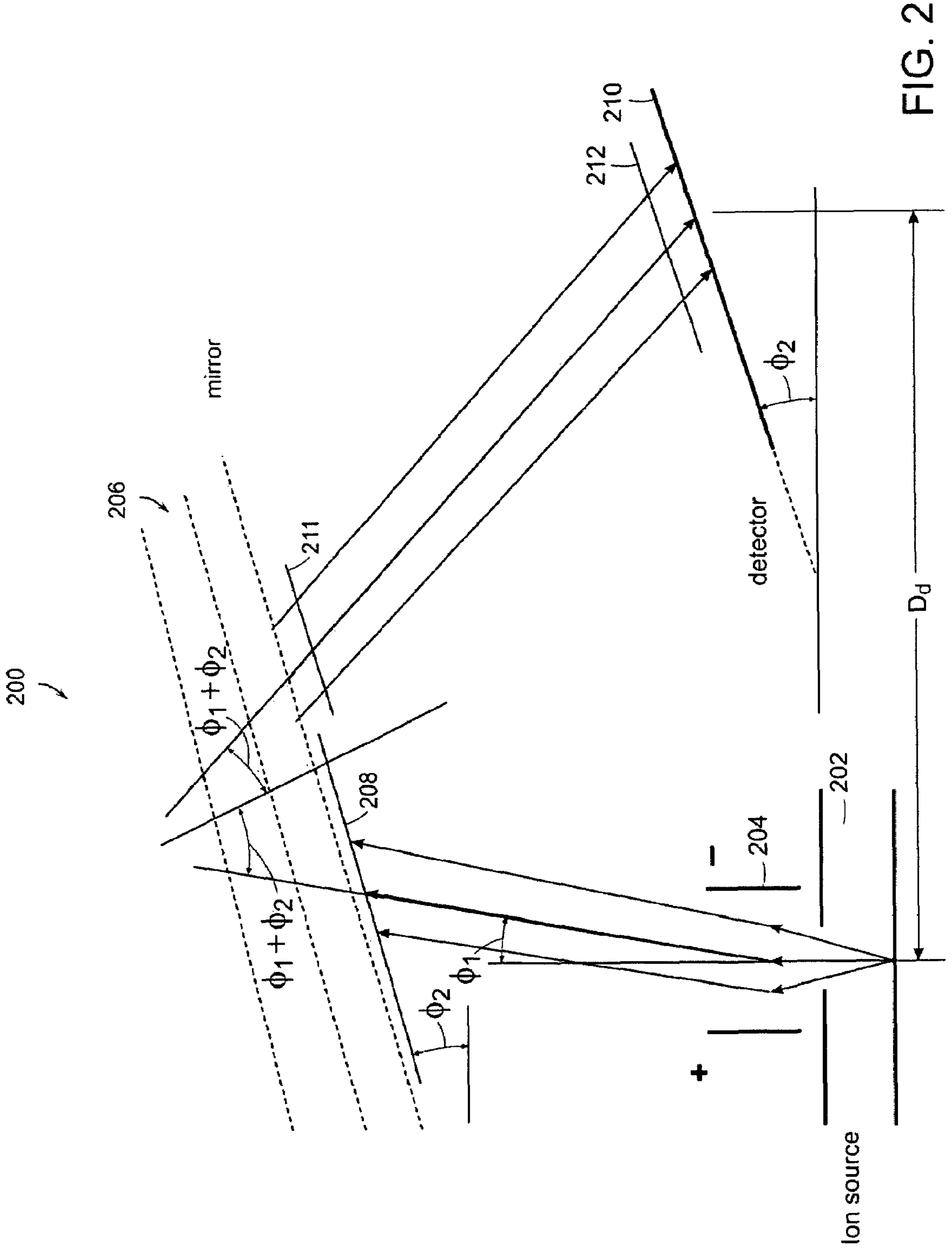
FIG. 2 illustrates an ion path diagram for a TOF mass spectrometer geometry with correction for the trajectory error due to ion deflection according to the present invention.

FIG. 2 illustrates an ion path diagram 200 for a TOF mass spectrometer geometry with correction for the trajectory error due to ion deflection according to the present invention. The ion path diagram 200 of FIG. 2 is similar to the ion path diagram 100 described in connection with FIG. 1A. However, the ion mirror is positioned at an angle relative to the incident ion beam so that the plane of constant ion flight time is parallel to the input surface of the ion mirror.

An ion source 202 generates the ions to be analyzed. An ion deflector 204 is used to deflect the ions from the ion source 202 at an angle $\phi_1$. An ion mirror 206 is positioned at an angle relative to the deflected ion beam so that the plane 208 of constant ion flight time is parallel to the input of the ion mirror 206.

An ion detector 210 is positioned parallel to an exit plane 211 of the ion mirror so that a second plane 212 of constant ion flight time is parallel to the input of the ion detector 210. With this TOF mass spectrometer geometry, essentially all of the ions generated by the ion source 202 arrive at the input of the ion detector 210 at the same time. In other words, with this TOF mass spectrometer geometry, the effective ion paths of essentially all of the ions from the ion source 202 to the ion detector 210 are essentially equal. Therefore, with this TOF mass spectrometer geometry, the total ion flight time depends only on the velocity component parallel to the electric field vector of the accelerating electric field. The transverse components only affect transmission and detection efficiency, but have no effect on the flight time.

Calculations using uniform field approximations for the deflection fields show that for small angles of deflection, the angle $\phi_1$ must be equal to the angle $\phi_2$ for the ion paths of essentially all of the ions from the ion source 202 to the ion mirror 206 to the ion detector 210 to be essentially equal. For a uniform deflecting field, the tangent of the deflection angle is given by $\tan \phi_1 = (\Delta V/2V)(d_1/d_2)$ where $d_1$ is the length of the deflection electrodes of the ion deflector 204, $d_2$ is the distance between the deflection electrodes of the ion deflector 204, $\Delta V$ is the potential difference applied across the deflection electrodes of the ion deflector 204, and V is the energy of the ions generated by the ion source 202. Neglecting fringing fields at the entrance and exit of the ion deflector 204, the velocity of an ion passing through the deflection field at a distance $\Delta x$ from the center of the deflector is given by $v_0[1-$ $\Delta x/d_2)(\Delta V/V)]^{1/2}$, where $v_0$ is the velocity of a similar ion entering the deflector at the midpoint between the electrodes 204.

The difference in flight time through the deflector for this trajectory compared to the central trajectory is $\delta t=(d_1/v_0)[v_0/v-1]$. The angle of the plane of constant ion flight time 208 is given by $\tan \phi_2=v_0\delta t/\Delta x=(d_1/\Delta x)[v_0/v-1]$. Expanding the expression for $v_0/v$ in a power series gives $v_0=v[1-(\Delta x/d_2)(\Delta V/V)]^{-1/2}=1+\Delta x/2d_2)(\Delta V/V)+ \ldots$ . For small deflection angles, a first order approximation is sufficiently accurate. Thus, the express $v_0/v-1=(\Delta x/2d_2)(\Delta V/V)$ and the $\tan \phi_2=(d_1/\Delta x)(\Delta x/2d_2)(\Delta V/V)=(\Delta V/2V)(d_1/d_2)=\tan \phi_1$.

Calculations with the SIMION simulation program also indicate that with this TOF mass spectrometer geometry where $\tan \phi_1=\tan \phi_2$, the effective ion paths of essentially all of the ions from the ion source 202, to the ion detector 210 are essentially equal. The $\tan \phi_1=\tan \phi_2$ condition is an excellent approximation for the equal ion path condition provided that $d_1$ is significantly greater than $d_2$. Error analysis was performed and it was determined that when the ratio $d_1/d_2$ is equal to four, the error is less than 1%.

Figure 3:
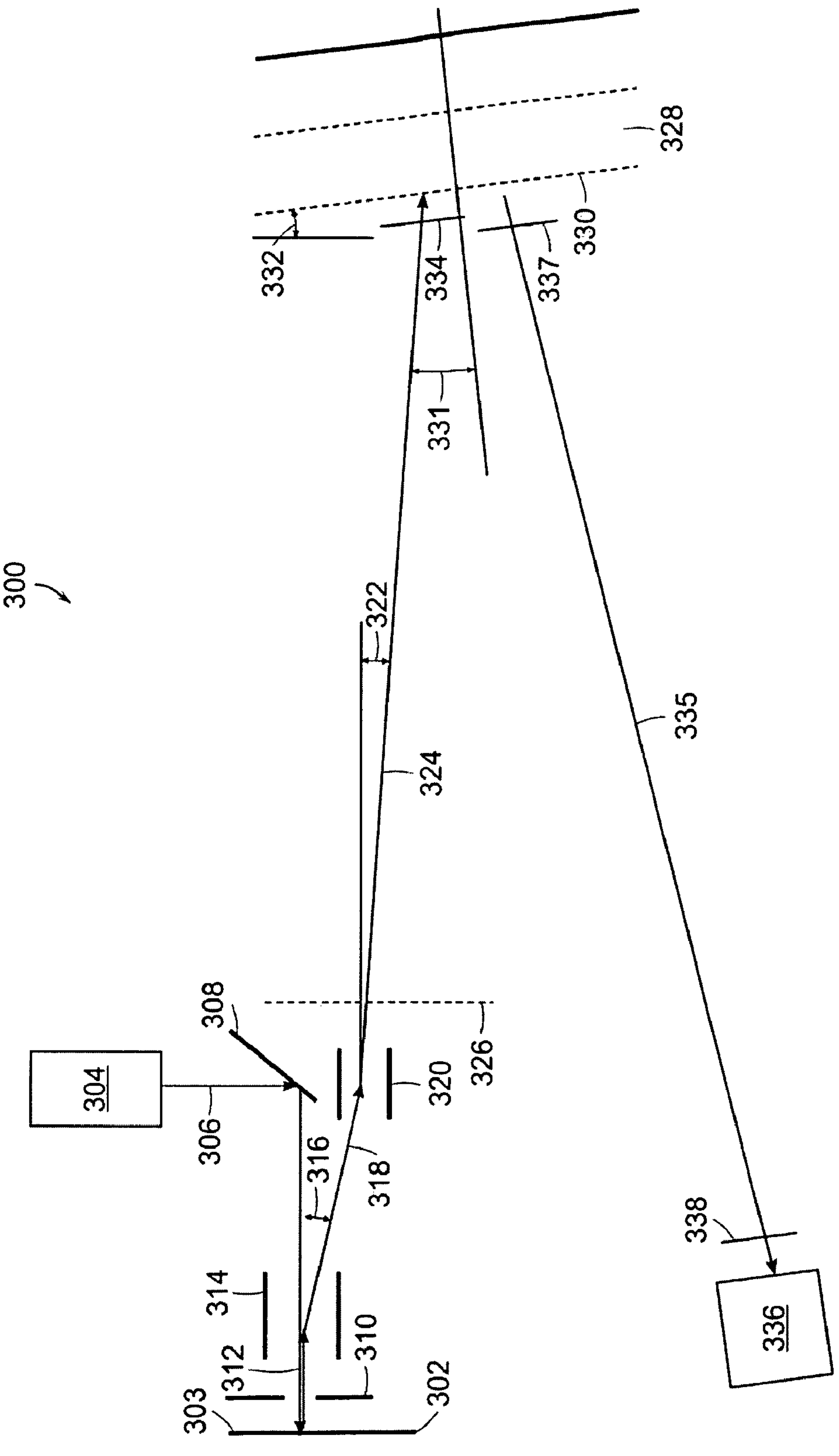
FIG. 3 illustrates a schematic diagram of a TOF mass spectrometer with a single ion mirror according to the present invention that compensates for trajectory error introduced by the ion deflector to achieve high resolution.

FIG. 3 illustrates a schematic diagram of a TOF mass spectrometer 300 with a single ion mirror according to the present invention that compensates for trajectory error introduced by the ion deflector to achieve high resolution. The TOF mass spectrometer 300 includes a pulsed ion source 302. The pulsed ion source 302 includes a laser 304 that generates a laser beam 306. An optical mirror 308 deflects the laser beam 306 so that it impacts the sample being analyzed, thereby generating a plume of ions.

An ion lens 310 is positioned adjacent to the pulse ion source 302. The ion lens 310 focuses the ions that are generated by the pulsed ion source 302 into a substantially parallel ion beam 312. A first ion deflector 314 is positioned adjacent to the ion lens 310 in the flight path of the ion beam 312 generated by the pulsed ion source 302. The first ion deflector 314 deflects the ion beam 312 at a predetermined angle 316 so that the ion beam 312 is deflected out of the path of the optical mirror 308 in the pulse ion source 302 to a deflected ion beam 318. In a specific embodiment constructed for testing, the first ion deflector 314 deflects the ion beam 312 relative to the incident laser beam 306 at an angle 316 that is equal to 4.6 degrees to form the first deflected ion beam 318.

A second ion deflector 320 is positioned in the flight path of the first deflected ion beam 318. The second ion deflector 320 deflects the ions in the first deflected ion beam 318 at a first predetermined angle 322 to a second deflected ion beam 324. The first predetermined angle 322 is equivalent to the angle $\phi_1$ in the ion path diagram 200 shown in FIG. 2 and in the calculations and simulations described herein. In the geometry shown in FIG. 3, the first predetermined angle $\phi_1$ is 0.4 degrees. In some embodiments, a low mass gate 326 is used to separate out the low mass ions from higher mass ions.

An ion mirror 328 is positioned to receive the ions in the second deflected ion beam 324 so that the input plane 330 of the ion mirror 328 is oriented at a second predetermined angle 332 relative to an output surface 303 of the pulsed ion source 302 so that the plane of constant ion flight time 334 is parallel to the input plane 330 of the ion mirror 328. The second predetermined angle 332 is equivalent to the angle $\phi_2$ in the ion path diagram shown in FIG. 2 and in the calculations and simulations described herein. In the specific embodiment constructed for testing, the second predetermined angle $\phi_2$ is 0.4 degrees. The angle 331 formed between the deflected ion beam 324 and the normal angle to the ion mirror 328 is the sum of the first and the second predetermined angles, which in the geometry shown in FIG. 3 is 0.8 degrees.

Ions traveling into the ion mirror 328 are decelerated by an electric field generated by the ion mirror 328 until the velocity component in the direction of the electric field becomes zero. Then, the ions reverse direction and are accelerated back through the ion mirror 328 in a reflected ion beam 335. The ions exit the ion mirror 328 with energies identical to their incoming energy but with velocities that are in a direction opposite to the direction of the entering ions. Ions with larger energies penetrate the ion mirror 328 more deeply and, consequently, will remain in the ion mirror for a longer period of time. In a properly designed ion mirror, the electric fields are selected to modify the flight paths of the ions such that ions of like mass and like charge exit the ion mirror 328 and arrive at an ion detector 336 at the same time regardless of their initial energy.

The input of the ion detector 336 is positioned parallel to an exit plane of the ion mirror 337 to receive the reflected ion beam 335 from the ion mirror 328 so that the plane of constant ion flight time is parallel to the input plane 338 of the ion detector 330. The first and second predetermined angles 322 and 332 are chosen so that the time-of-flight from the pulsed ion source 302 to the ion detector 336 is substantially independent of the path that the ions follow. Choosing the first predetermined angle 322 to be equal to the second predetermined angle 332 as described herein will correct the trajectory error due to the ion deflector.

Figure 4:
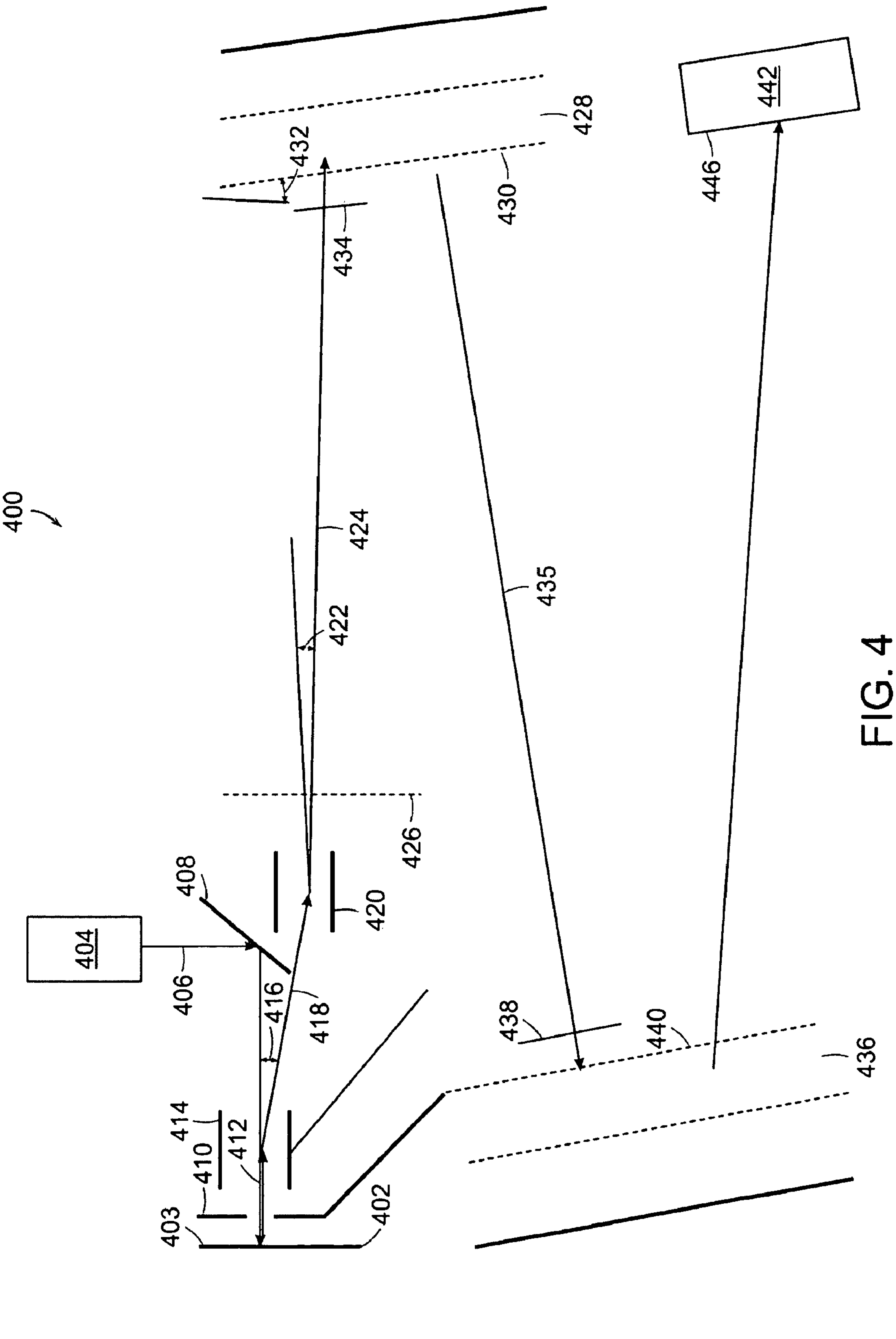
FIG. 4 illustrates a schematic diagram of a TOF mass spectrometer with a double ion mirror configuration according to the present invention that compensates for trajectory error introduced by the ion deflector to achieve high resolution.

FIG. 4 illustrates a schematic diagram of a TOF mass spectrometer 400 with a double ion mirror configuration according to the present invention that compensates for trajectory error introduced by the ion deflector to achieve high resolution. TOF mass spectrometer 400 is similar to the TOF mass spectrometer 300 described in connection with FIG. 3. However, TOF mass spectrometer 400 includes two ion mirrors. Two ion mirrors increase the effective ion path length, thereby increasing the mass resolution.

The TOF mass spectrometer 400 includes a pulsed ion source 402. The pulsed ion source 402 includes a laser 404 that generates a laser beam 406. An optical mirror 408 deflects the laser beam 406 so that it impacts the sample being analyzed, thereby generating a plume of ions. An ion lens 410 is positioned adjacent to the pulse ion source 402. The ion lens 410 focuses the ions that are generated by the pulsed ion source 402 into a substantially parallel ion beam 412. A first ion deflector 414 is positioned adjacent to the ion lens 410 in the flight path of the ion beam 412 generated by the pulsed ion source 402. The first ion deflector 414 deflects the ion beam 412 at a predetermined angle 416 so that the ion beam 412 is deflected out of the path of the optical mirror 408 in the pulse ion source 402 to a deflected ion beam 418.

A second ion deflector 420 is positioned in the flight path of the first deflected ion beam 418. The second ion deflector 420 deflects the ions in the first deflected ion beam 418 at a first predetermined angle 422 to a second deflected ion beam 424. The first predetermined angle 422 is equivalent to the angle $\phi_1$ in the ion path diagram 200 shown in FIG. 2 and in the calculations and simulations described herein.

In some embodiments, a low mass gate 426 is used to separate out the low mass ions from higher mass ions. An ion mirror 428 is positioned to receive the ions in the second deflected ion beam 424 so that the input plane 430 of the ion mirror 428 is oriented at a second predetermined angle 432 relative to an output surface 403 of the pulsed ion source so that the plane of constant ion flight time 434 is parallel to the input plane 430 of the ion mirror 428. The second predetermined angle 432 is equivalent to the angle $\phi_2$ in the ion path diagram shown in FIG. 2 and in the calculations and simulations described herein. The angle 440 formed between the reflected ion beam 435 and the normal angle to the ion mirror 428 is the sum of the first and the second predetermined angles, which in the geometry shown in FIG. 3 is 0.8 degrees.

A second ion mirror 436 is positioned to receive the ions reflected from the ion mirror 428 so that the input plane 440 of the ion mirror 436 is parallel to the exit plane 430 of ion mirror 428. The second ion mirror 436 increases the effective path length of the TOF mass spectrometer 400. An ion detector 442 is positioned to receive the ions reflected from the second ion mirror 436 so that the input plane 446 of the ion detector 442 is parallel to the exit plane 440 of ion mirror 436.

Figure 5A:
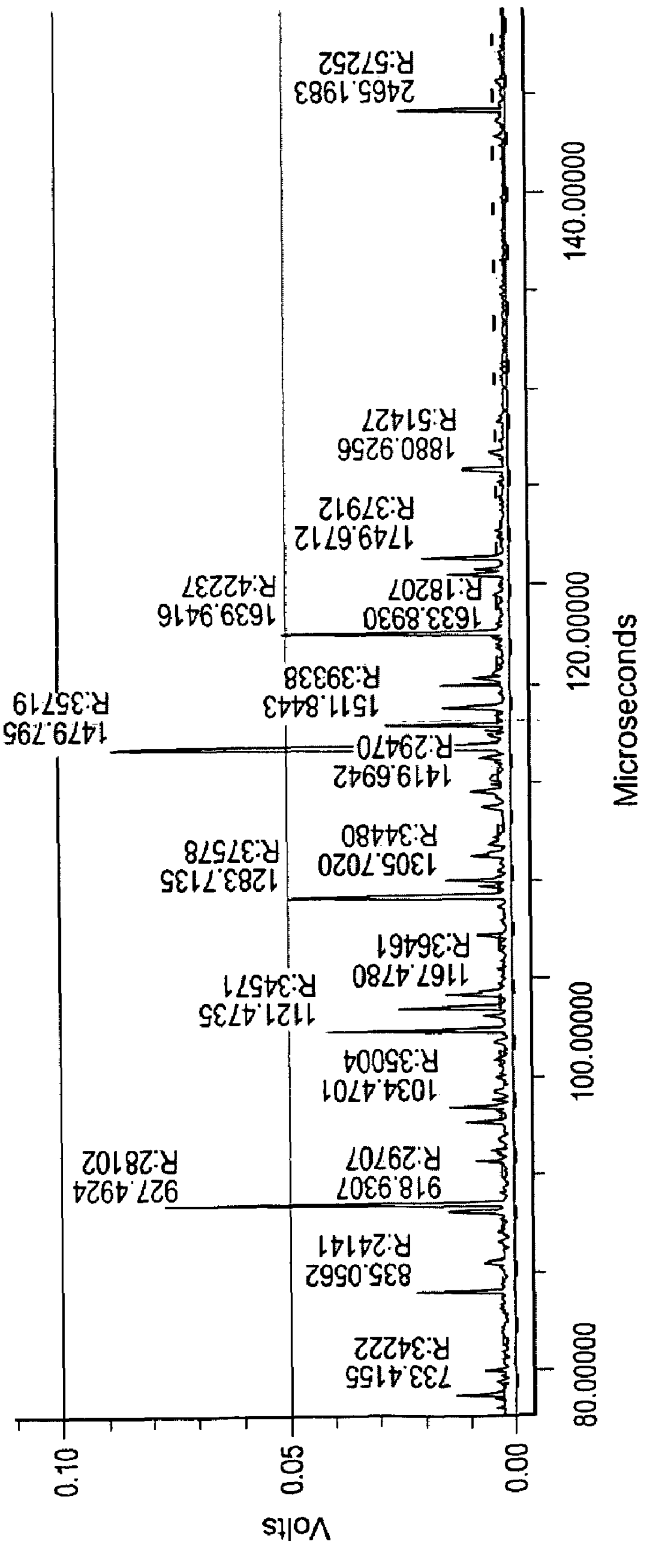
FIG. 5A illustrates a spectrum of peptides that ranges from 75 microseconds to 145 microseconds of peptides from the tryptic digest of one picomole of BSA that was measured with a TOF mass spectrometer with correction for trajectory error according to the present invention by averaging 1,000 laser shots.

FIG. 5A illustrates a spectrum 550 of peptides that ranges from 75 microseconds to 145 microseconds of peptides from the tryptic digest of one picomole of BSA that was measured with a TOF mass spectrometer with correction for trajectory error according to the present invention by averaging 1,000 laser shots. The numbers labeling the peaks in the full spectrum are mass and resolving power determined for the monoisotopic peak for each peptide from the tryptic digest.

Figure 5B:
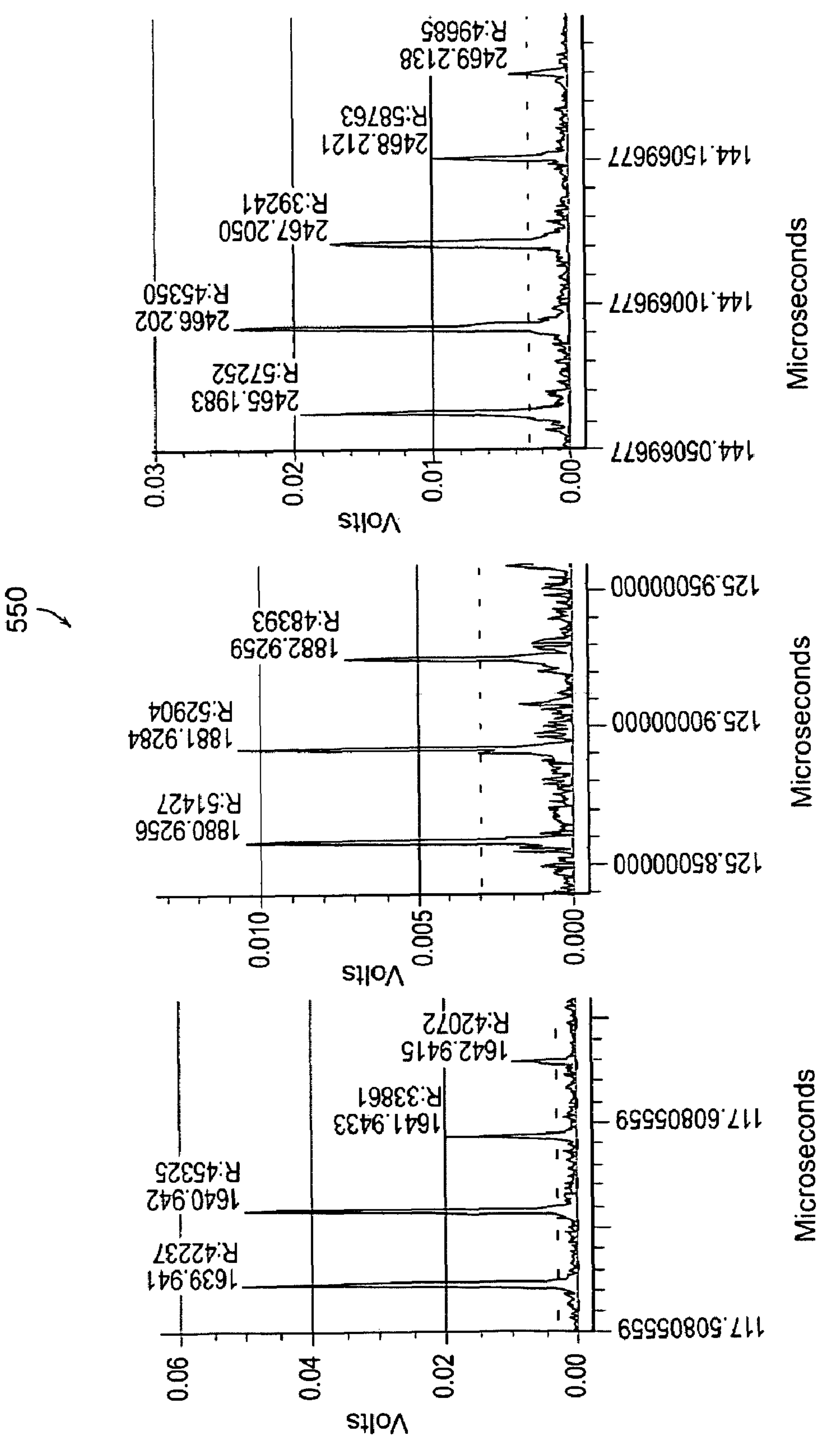
FIG. 5B illustrates an expanded spectra of selected regions of the spectra shown in FIG. 5A that shows the resolving power for peptides at nominal masses 1639, 1880, and 2465.

FIG. 5B illustrates an expanded spectrum 500 of selected regions of the spectra shown in FIG. 5A that shows the peaks in the isotopic clusters corresponding to nominal masses 1639, 1880, and 2465. In the expanded spectra 500, the mass and resolving powers are shown for all of the peaks in the isotopic cluster.

The results in the spectra 500 and 550 indicate a significant improvement in mass resolution using a TOF mass spectrometer with correction for trajectory error according to the present invention compared with prior art TOF mass spectrometers. The time resolution with the 0.5 ns digitizer is the most significant limitation on resolving power of TOF mass spectrometer with correction for trajectory error according to the present invention. Resolving power for the spectra obtained using a similar TOF mass spectrometer without trajectory correction was determined to be typically less than 40% of that obtained using the TOF mass spectrometer with trajectory correction according to the present invention.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, which may be made therein without departing from the spirit and scope of the invention.

What is claimed is:

1. A time-of-flight mass spectrometer comprising:
- a. a pulsed ion source that generates a pulse of ions from a sample to be analyzed;
- b. an ion lens positioned adjacent to the pulsed ion source, the ion lens focusing the pulse of ions into an ion beam;
- c. an ion deflector positioned in a path of the ion beam, the ion deflector deflecting the ion beam into a deflected ion beam path;
- d. an ion mirror that is positioned in the deflected ion beam path so that a plane of constant ion flight time is parallel to an input surface of the ion mirror, the ion mirror producing a reflected ion beam; and
- e. an ion detector that is positioned in a path of the reflected ion beam, wherein an input surface of the ion detector is substantially parallel to an exit plane of the ion mirror, the ion detector detecting a time-of-flight of ions from the pulsed ion source to the ion detector that is substantially independent of a path traveled.

2. The time-of-flight mass spectrometer of claim 1 wherein the pulsed ion source comprises a MALDI pulsed ion source.

3. The time-of-flight mass spectrometer of claim 1 wherein the pulsed ion source comprises a laser desorption pulsed ion source.

4. The time-of-flight mass spectrometer of claim 1 further comprising a second ion deflector positioned proximate to the ion lens, wherein the second ion deflector deflects the ion beam away from the pulsed ion source.

5. The time-of-flight mass spectrometer of claim 1 further comprising a second ion mirror that is positioned in the path of the reflected ion beam before the ion detector so that ions of like mass and like charge reach the ion detector at substantially same time.

6. A time-of-flight mass spectrometer comprising:
- a. a pulsed ion source that generates a pulse of ions from a sample to be analyzed;
- b. an ion lens positioned adjacent to the pulsed ion source, the ion lens focusing the pulse of ions into an ion beam;
- c. an ion deflector positioned in a path of the ion beam, the ion deflector deflecting the ion beam at a first predetermined angle into a deflected ion beam path;
- d. an ion mirror that is positioned in the deflected ion beam path so that a normal direction to an input surface of the ion mirror is at a second predetermined angle relative to the deflected ion beam path, the ion mirror producing a reflected ion beam; and
- e. an ion detector that is positioned in a path of the reflected ion beam, wherein the first and second predetermined angles are chosen so that a time-of-flight of ions from the pulsed ion source to the ion detector is substantially independent of a path traveled.

7. The time-of-flight mass spectrometer of claim 6 wherein the pulsed ion source comprises a MALDI pulsed ion source.

8. The time-of-flight mass spectrometer of claim 6 wherein the pulsed ion source comprises a laser desorption pulsed ion source.

9. The time-of-flight mass spectrometer of claim 6 further comprising a second ion deflector positioned proximate to the ion lens, wherein the second ion deflector deflects the ion beam away from the pulsed ion source.

10. The time-of-flight mass spectrometer of claim 6 wherein the first and the second predetermined angles are substantially equal.

11. The time-of-flight mass spectrometer of claim 6 further comprising a second ion mirror that is positioned in the path of the reflected ion beam before the ion detector, so that ions of like mass and like charge reach the ion detector at substantially the same time.

12. A time-of-flight mass spectrometer comprising:
- a. a pulsed ion source that generates a pulse of ions from a sample to be analyzed;
- b. an ion lens positioned adjacent to the pulsed ion source, the ion lens focusing the pulse of ions into an ion beam;
- c. an ion deflector positioned in a path of the ion beam, the ion deflector deflecting the ion beam at a first predetermined angle into a first deflected ion beam path;
- d. a second ion deflector positioned in a path of the first deflected ion beam, the second ion deflector deflecting the ion beam at a second predetermined angle into a second deflected ion beam path;
- e. an ion mirror that is positioned in the second deflected ion beam path so that a normal direction to an input surface of the ion mirror is at a third predetermined angle relative to the second deflected ion beam path, the ion mirror producing a reflected ion beam; and f. an ion detector that is positioned in the path of the reflected ion beam, wherein the second and third predetermined angles are chosen so that a time-of-flight of ions from the pulsed ion source to the ion detector is substantially independent of a path traveled.

13. The time-of-flight mass spectrometer of claim 12 wherein the pulsed ion source comprises a MALDI pulsed ion source.

14. The time-of-flight mass spectrometer of claim 12 wherein the pulsed ion source comprises a laser desorption pulsed ion source.

15. The time-of-flight mass spectrometer of claim 12 wherein the second predetermined angle is substantially equal to the third predetermined angle.

16. The time-of-flight mass spectrometer of claim 12 further comprising a second ion mirror that is positioned in the path of the reflected ion beam before the ion detector, the ion mirror producing a reflected ion beam.

17. A time-of-flight mass spectrometer comprising:

a. a means for generating a pulse of ions from a sample to be analyzed;

b. a means for forming an ion beam from the pulse of ions;

c. an means for deflecting the ion beam into a deflected ion beam path;

d. a mean for correcting for initial ion energy with an ion mirror;

e. a means for correcting trajectory error in the deflected ion beam path; and f. a means for detecting a time-of-flight of ions with corrected trajectory, wherein a detected time-of-flight of ions from the pulsed ion source to the ion detector is substantially independent of a path that the ions travel.

18. The time-of-flight mass spectrometer of claim 17 wherein the means for generating a pulse of ions from a sample to be analyzed comprises MALDI.

19. The time-of-flight mass spectrometer of claim 17 wherein the means for generating a pulse of ions from a sample to be analyzed comprises laser desorption.

20. The time-of-flight mass spectrometer of claim 17 further comprising a second mean for correcting for initial ion energy with a second ion mirror.

* * * * *